(12) United States Patent
Wang et al.

(10) Patent No.: US 11,458,494 B2
(45) Date of Patent: Oct. 4, 2022

(54) BACKPACK SPRAYER

(71) Applicant: INTRADIN (SHANGHAI) MACHINERY CO., LTD., Shanghai (CN)

(72) Inventors: Gaofeng Wang, Shanghai (CN); Chenliang Yuan, Shanghai (CN)

(73) Assignee: INTRADIN (SHANGHAI) MACHINERY CO., LTD, Shanghai (CN)

( * ) Notice: Subject to any disclaimer, the term of this patent is extended or adjusted under 35 U.S.C. 154(b) by 0 days.

(21) Appl. No.: 17/401,954

(22) Filed: Aug. 13, 2021

(65) Prior Publication Data

US 2021/0370330 A1    Dec. 2, 2021

(30) Foreign Application Priority Data

Jul. 9, 2021 (CN) .......................... 202110780662.5

(51) Int. Cl.
| | |
|---|---|
| *B05B 11/00* | (2006.01) |
| *B05B 9/08* | (2006.01) |
| *B05B 15/652* | (2018.01) |
| *A01M 7/00* | (2006.01) |
| *B05B 7/24* | (2006.01) |
| *B05B 12/00* | (2018.01) |

(Continued)

(52) U.S. Cl.
CPC ....... *B05B 11/3052* (2013.01); *A01M 1/2033* (2013.01); *A01M 7/0017* (2013.01); *B05B 7/1209* (2013.01); *B05B 7/2416* (2013.01); *B05B 7/2435* (2013.01); *B05B 7/2475* (2013.01); *B05B 9/08* (2013.01); *B05B 9/0811* (2013.01); *B05B 12/002* (2013.01); *B05B 15/652* (2018.02)

(58) Field of Classification Search
CPC . B05B 11/3052; B05B 9/0811; B05B 15/652; B05B 7/1209; B05B 7/2435; B05B 7/2475; B05B 7/2416; B05B 9/08; B05B 12/002; A01M 1/2033; A01M 7/0017
See application file for complete search history.

(56) References Cited

U.S. PATENT DOCUMENTS

| | | | | |
|---|---|---|---|---|
| 8,550,376 | B2 * | 10/2013 | Munn | .................. B05B 7/2437 239/300 |
| 2011/0114749 | A1 * | 5/2011 | Munn | .................. B05B 12/008 239/74 |

(Continued)

FOREIGN PATENT DOCUMENTS

| | | |
|---|---|---|
| CN | 110665755 A | 1/2020 |
| CN | 111760693 A | 10/2020 |

*Primary Examiner* — Frederick C Nicolas
(74) *Attorney, Agent, or Firm* — Wayne IP LLC

(57) ABSTRACT

A backpack sprayer includes a housing, a spray nozzle assembly, a fan assembly and a switch assembly. The housing is configured to contain a liquid. The spray nozzle assembly is communicated with the housing, and is configured to spray the liquid out from the housing. The fan assembly is connected to the spray nozzle assembly, and is configured to provide the spray nozzle assembly with power to spray the liquid out from the housing. The switch assembly is connected to the spray nozzle assembly and electrically connected to the fan assembly, and is configured to control opening and closing of the spray nozzle assembly and start and shutdown of the fan assembly simultaneously.

10 Claims, 6 Drawing Sheets

(51) Int. Cl.
 *B05B 7/12* (2006.01)
 *A01M 1/20* (2006.01)

(56) References Cited

U.S. PATENT DOCUMENTS

| | | | | |
|---|---|---|---|---|
| 2011/0114757 | A1* | 5/2011 | Munn | B05B 7/083 |
| | | | | 239/291 |
| 2012/0067972 | A1* | 3/2012 | Schliemann | A01M 7/0021 |
| | | | | 239/152 |
| 2019/0060922 | A1* | 2/2019 | Wright | B05B 9/0888 |
| 2021/0331187 | A1* | 10/2021 | Youngblut | A01M 7/0021 |
| 2021/0370327 | A1* | 12/2021 | Pfingstgraef | B05B 7/2435 |

* cited by examiner

BACKPACK SPRAYER

CROSS-REFERENCE TO RELATED APPLICATIONS

This application claims the benefit of priority from Chinese Patent Application No. 202110780662.5, filed on Jul. 9, 2021. The content of the aforementioned application, including any intervening amendments thereto, is incorporated herein by reference in its entirety.

TECHNICAL FIELD

This application relates to portable agricultural sprayers, and more particularly to a backpack sprayer.

BACKGROUND

In the commercially-available backpack sprayers, the fan assembly and the spray nozzle assembly are separately controlled by two independent switches, so that two steps are needed to switch on or off the backpack sprayer. Specifically, in use, it is required to switch on the fan assembly, and then open the valve for controlling the spray nozzle assembly. Under the action of the fan assembly, the liquid is sprayed out from the housing through the spray nozzle assembly. When switching off the backpack sprayer, it is required to first close the valve for controlling the spray nozzle assembly, and then switch off the fan assembly, rendering the switching process of the backpack sprayer complicated and time-consuming. Moreover, if a user forgets to switch off the switch for controlling the spray nozzle assembly, the liquid may leak from the spray nozzle assembly, resulting in the waste.

SUMMARY

An object of this application is to provide a backpack sprayer with simple and time-saving operation.

Technical solutions of this application are described as follows.

This application provides a backpack sprayer, comprising:
 a housing;
 a spray nozzle assembly;
 a fan assembly; and
 a switch assembly;
 wherein the housing is configured to contain a liquid; the spray nozzle assembly is communicated with the housing, and is configured to spray the liquid out from the housing; the fan assembly is connected to the spray nozzle assembly, and is configured to provide the spray nozzle assembly with power to spray the liquid out from the housing; the switch assembly is connected to the spray nozzle assembly, and is electrically connected to the fan assembly; and the switch assembly is configured to simultaneously control opening and shutting of the spray nozzle assembly and start and shutdown of the fan assembly.

In some embodiments, the switch assembly is movable with respect to the spray nozzle assembly to allow the switch assembly to be switched between a first gear position and a second gear position; when the switch assembly is at the first gear position, the fan assembly is started and the spray nozzle assembly is opened; and when the switch assembly is at the second gear position, the fan assembly is shut down and the spray nozzle assembly is shut off.

In some embodiments, the switch assembly is rotatable with respect to the spray nozzle assembly to allow the switch assembly to be switched between the first gear position and the second gear position.

In some embodiments, the switch assembly comprises a valve and a switch paddle connected to the valve; the valve is connected to the spray nozzle assembly; the switch paddle is configured to follow the valve to rotate synchronously with respect to the spray nozzle assembly, so that the valve and the switch paddle are synchronously switched between the first gear position and the second gear position; when the switch paddle is switched to the first gear position, the fan assembly is started; when the switch paddle is switched to the second gear position, the fan assembly is shut down; when the valve is switched to the first gear position, the spray nozzle assembly is opened; and when the valve is switched to the second gear position, the spray nozzle assembly is shut off.

In some embodiments, the backpack sprayer further comprises a drive switch; the drive switch is connected to the valve, and is electrically connected to the fan assembly; the drive switch is provided with a pressable button; the valve is configured to drive the switch paddle to rotate synchronously with respect to the spray nozzle assembly, so that the switch paddle presses or releases the pressable button to switch the drive switch between an on-state and an off-state; when the drive switch is in the on-state, the fan assembly is started; and when the drive switch is in the off-state, the fan assembly is shut down.

In some embodiments, a pressing slope is provided on a side of the switch paddle facing the pressable button, and the pressing slope is configured to press the pressable button.

In some embodiments, the spray nozzle assembly comprises a spray nozzle and a pipeline; wherein one end of the pipeline is connected to the housing, and the other end of the pipeline is connected to the spray nozzle, so as to realize a communication between the housing and the spray nozzle; the switch assembly is configured to control opening and shutting of the pipeline; and the spray nozzle is configured to spray the liquid out from the housing through the pipeline.

In some embodiments, a first through hole is provided on the switch assembly; a second through hole is provided on the pipeline; the communication between the housing and the spray nozzle is enabled through the second through hole of the pipeline; the switch assembly is rotatable with respect to the spray nozzle assembly to allow the switch assembly to be switched between the first gear position and the second gear position; when the switch assembly is switched to the first gear position, the first through hole is aligned with the second through hole, so that the switch assembly and the pipeline are communicated to further realize the communication between the housing and the spray nozzle; and when the switch assembly is switched to the second gear position, the first through hole is staggered with the second through hole, so that the switch assembly and the pipeline are not communicated to realize the shut-off between the housing and the spray nozzle.

In some embodiments, the backpack sprayer further comprises a controller; wherein the controller is electrically connected to the fan assembly and the switch assembly; the switch assembly is configured to send a control signal to the controller, and the controller is configured to receive the control signal sent by the switch assembly to control the start and shutdown of the fan assembly.

In some embodiments, the controller is configured to receive the control signal sent by the switch assembly to control the fan assembly to start, or control the fan assembly to shut down after a preset operation time is reached.

Compared to the Prior Art, this Application has the Following Beneficial Effects.

In the backpack sprayer provided herein, the switch assembly controls the start of the fan assembly and the opening of the spray nozzle assembly simultaneously, and the fan assembly provides the spray nozzle assembly with power to spray the liquid out from the housing. After use, the switch assembly simultaneously controls the shutdown of the fan assembly and the closing of the spray nozzle assembly. Based on the synchronous control of the fan assembly and the spray nozzle assembly using the switch assembly, this application simplifies the operation and reduces the time consumption compared to the independent control of the two assemblies. Moreover, based on the synchronous control, the spray nozzle assembly will be closed when switching off the backpack sprayer, preventing the leakage of the liquid from the spray nozzle assembly.

BRIEF DESCRIPTION OF THE DRAWINGS

In order to more clearly explain the technical solutions of embodiments of the disclosure, the accompanying drawings of the present disclosure will be briefly described below. Obviously, presented in the drawings described below are only some embodiments of the disclosure. For those of ordinary skill in the art, other drawings can be obtained based on the accompanying drawings without paying any creative efforts.

Figure 1:
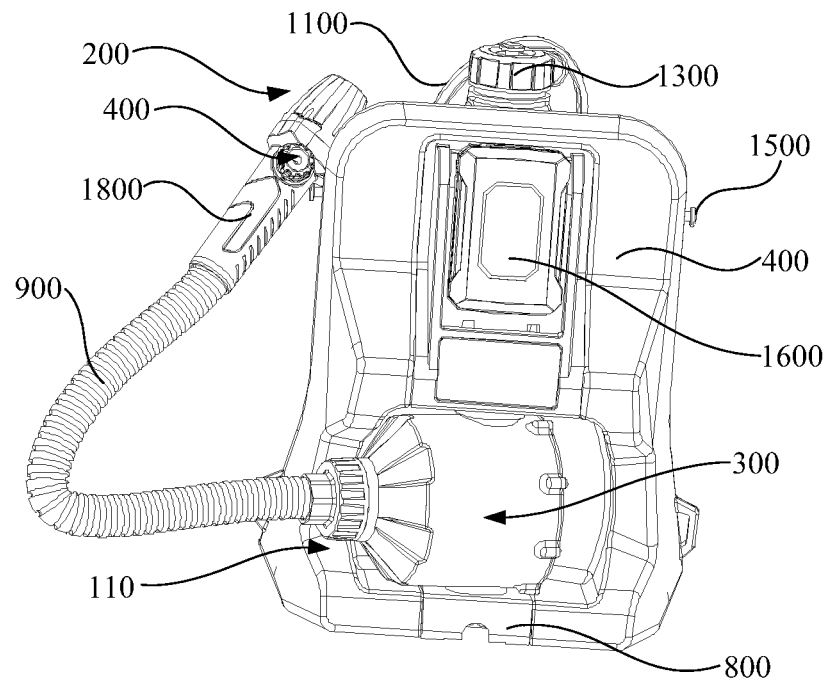
FIG. 1 is a structural diagram of a backpack sprayer according to an embodiment of the disclosure.

In the drawings, 100, housing; 110, recess; 120, opening; 200, spray nozzle assembly; 210, spray nozzle; 220, pipeline; 221, second through hole; 230, pipeline connector; 300, fan assembly; 310, drive component; 320, fan; 321, counterbore; 330, drive switch; 331, pressable button; 400, switch assembly; 410, valve; 411, first through hole; 420, switch paddle; 421, pressing slope; 430, moving component; 440, valve body-mounting component; 450, fastener; 500, controller; 600, adjustment structure; 610, elastic component; 620. butting component; 700, guide shaft; 800, fixing component; 810, positioning groove; 900, connecting pipe; 1000, strap; 1100, handle; 1200, soft cushion; 1300, cover component; 1400, connecting component; 1500, hanging component; 1600, power supply; 1700, power supply outer panel; 1800, hand-holding part; 1900, second tubular component; 2000, first hole; 2010, first sub-hole 2020, second sub-hole; 2030, third sub-hole; 2100, second hole; and 2200, power plug.

The objects, functional characteristics and beneficial effects of the present application will be further described with reference to the embodiments and the accompanying drawings.

DETAILED DESCRIPTION OF EMBODIMENTS

The technical solutions of the disclosure will be described clearly and completely below with reference to the accompanying drawings and the embodiments. Obviously, these embodiments are merely illustrative of the present disclosure, and are not intended to limit the scope of the present disclosure. For those of ordinary skill in the art, other embodiments obtained based on the accompanying embodiments without paying any creative efforts shall fall within the scope of the present disclosure.

It should be noted that all directional indications (such as up, down, left, right, front, rear, etc.) in the embodiments of the present disclosure are only used to explain the relative position relationship, movement situation, etc. between the components under a certain attitude (as shown in the attached figures). If the specific posture changes, the directional indication changes accordingly. In addition, terms "first", "second", etc. used herein are only for descriptive purposes, and cannot be understood as indicating or implying their relative importance or implicitly indicating the number of technical features referred to. Thus, the features defined by "first" or "second" may explicitly or implicitly indicate that at least one of the features is included. The term "and/or" includes any one or any combination of two or more of the listed items. In addition, various embodiments can be combined with each other on the premise that the combined technical solutions can be implemented by those skilled in the art. When the combination of technical solutions is contradictory or cannot be achieved, such a combination of technical solutions should not be considered as falling within the scope of the present disclosure.

The specific structure of the backpack sprayer will be described below.

As shown in FIG. 1, a backpack sprayer includes a housing 100, a spray nozzle assembly 200, a fan assembly 300 and a switch assembly 400. The housing 100 is configured to contain a liquid. The spray nozzle assembly 200 is communicated with the housing 100, and is configured to spray the liquid out from the housing 100. The fan assembly 300 is connected to the spray nozzle assembly 200, and is configured to provide the spray nozzle assembly 200 with power to spray the liquid out from the housing 100. The switch assembly 400 is connected to the spray nozzle assembly 200, and is electrically connected to the fan assembly 300. The switch assembly 400 is configured to control opening and closing of the spray nozzle assembly 200 and start and shutdown of the fan assembly 300 simultaneously.

When using the backpack sprayer, the switch assembly 400 simultaneously controls the start of the fan assembly 300 and the opening of the spray nozzle assembly 200, and the fan assembly 300 provides the spray nozzle assembly 200 with a force to spray the liquid out from the housing 100. After the spraying operation is completed, the shutdown of the fan assembly 300 and the shutoff of the spray nozzle assembly 200 can be simultaneously performed through the switch assembly 400. On one hand, the switch assembly 400 of this application can synchronously control the fan assembly 300 and the spray nozzle assembly 200, simplifying the operation and reducing the time consumption compared to the independent control. On the other hand, based on the synchronous control, the spray nozzle assembly 200 will be closed when switching off the backpack sprayer, preventing the leakage of the liquid from the spray nozzle assembly 200.

In an embodiment, the switch assembly 400 is movable with respect to the spray nozzle assembly 200, so that the switch assembly 400 can be switched between a first gear position and a second gear position. When the switch assembly 400 is at the first gear position, the fan assembly 300 is started and the spray nozzle assembly 200 is opened simultaneously. When the switch assembly 400 is switched to the second gear position, the fan assembly 300 is switched off and the spray nozzle assembly 200 is shut off simultaneously.

In an embodiment, the switch assembly 400 is rotatable with respect to the spray nozzle assembly 200, so that the switch assembly 400 can be switched between the first gear position and the second gear position.

Figure 2:
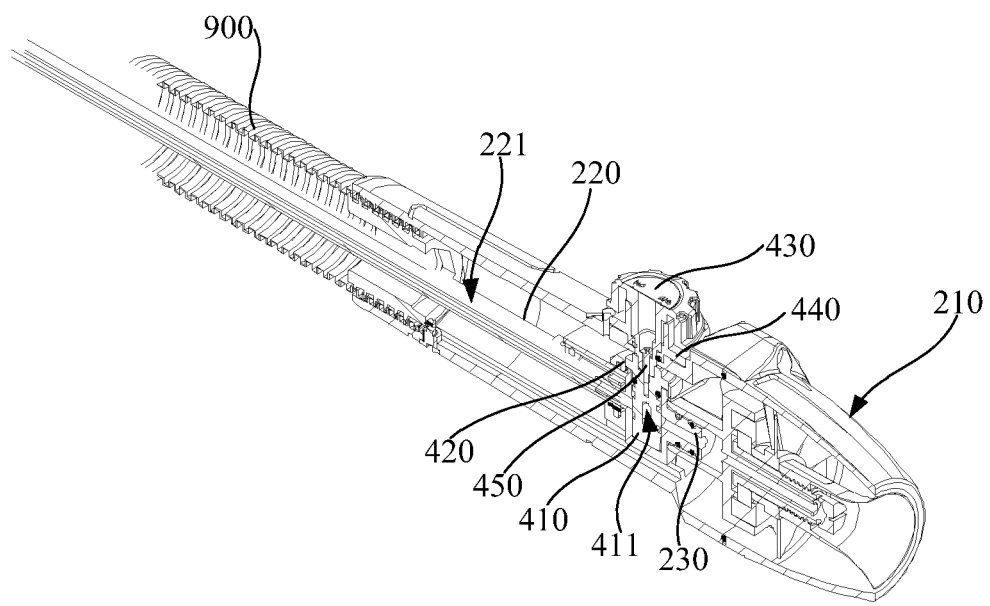
FIG. 2 is a sectional view of combination of a spray nozzle assembly and a switch assembly according to an embodiment of the disclosure.
Figure 3:
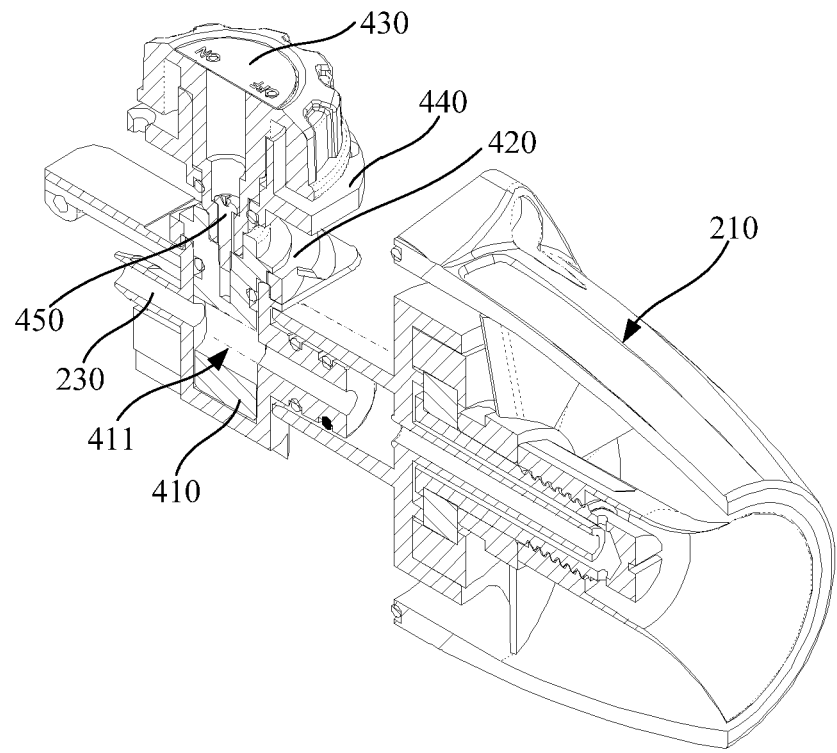
FIG. 3 is a sectional view of combination of the spray nozzle assembly and the switch assembly according to another embodiment of the disclosure.
Figure 4:
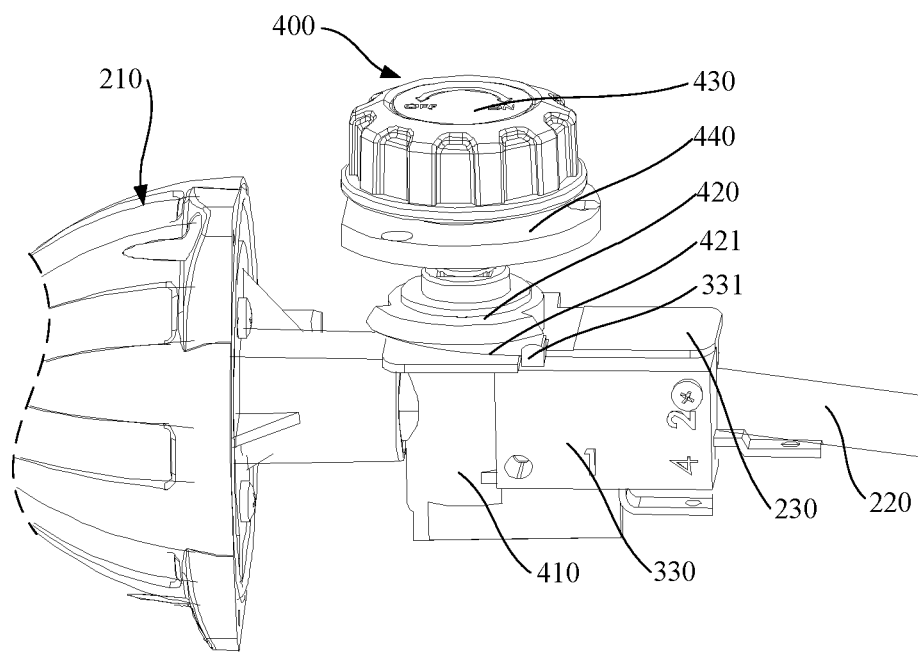
FIG. 4 is a structural diagram of the combination of the spray nozzle assembly and the switch assembly according to an embodiment of the disclosure.

As illustrated in an embodiment in FIGS. 2-4, the switch assembly 400 includes a valve 410 and a switch paddle 420 connected to the valve 410. The valve 410 is connected to the spray nozzle assembly 200. The switch paddle 420 is configured to follow the valve 410 to rotate synchronously with respect to the spray nozzle assembly 200, so that the valve 410 and the switch paddle 420 can be synchronously switched between the first gear position and the second gear position. When the switch paddle 420 is switched to the first gear position, the fan assembly 300 is started. When the switch paddle 420 is switched to the second gear position, the fan assembly 300 is switched off. When the valve 410 is switched to the first gear position, the spray nozzle assembly 200 is opened. When the valve 410 is switched to the second gear position, the spray nozzle assembly 200 is shut off.

As shown in an embodiment in FIGS. 3-4, the switch assembly 400 further includes a moving component 430. The moving component 430 is connected to the valve 410, and can move with respect to the spray nozzle assembly 200 to drive the valve 410 and the switch paddle 420 to move synchronously, so that the moving component 430, the valve 410 and the switch paddle 420 can be synchronously switched between the first gear position and the second gear position. In actual use, when the user applies force to the moving component 430, the moving component 430 drives the valve 410 and the switch paddle 420 to move synchronously, thereby realizing the synchronous control of the spray nozzle assembly 200 and the fan assembly 300. In some embodiments, the moving component 430 is a knob, and can rotate with respect to the spray nozzle assembly 200 to drive the valve 410 and the switch paddle 420 to rotate synchronously.

As shown in FIG. 3, in an embodiment, the fan assembly 300 includes a drive component 310 and a fan 320 connected to the drive component 310. The fan 320 is connected to the spray nozzle assembly 200. The switch assembly 400 is electrically connected to the drive component 310. The switch assembly 400 is configured to control start and shutdown of the drive component 310, so as to control start and shutdown of the fan 320 by the drive component 310. The fan 320 is configured to provide the spray nozzle assembly 200 with power to spray the liquid out from the housing 100. In some embodiments, the operation of the fan 320 can make the pressure in the spray nozzle assembly 200 lower than the atmospheric pressure in the housing 100, so that the liquid in the housing 100 can enter the spray nozzle assembly 200 to be sprayed out under the action of the atmospheric pressure. The drive component 310 can be, but is not limited to a motor, and the drive component 310 is configured to drive the fan 320 to rotate.

As shown in FIG. 4, in an embodiment, the backpack sprayer further includes a drive switch 330. The drive switch 330 is connected to the valve 410, and is electrically connected to the fan assembly 300. The drive switch 330 is provided with a pressable button 331. The valve 410 can drive the switch paddle 420 to rotate synchronously with respect to the spray nozzle assembly 200, so as to allow the switch paddle 420 to press or release the pressable button 331, achieving the switch of the drive switch 330 between an on-state and an off-state. When the drive switch 330 is in the on-state, the fan assembly 300 is started; and when the drive switch 330 is in the off-state, the fan assembly 300 is shut down. In some embodiments, when the switch paddle 420 is in the second gear position, the switch paddle 420 is separated from the pressable button 331, and the pressable button 331 is in the released state, so that the drive switch 330 is in the off-state, and the fan assembly 300 is shut down. When the switch paddle 420 is in the first gear position, the drive switch 330 is pressed by the switch paddle 420, so that the drive switch 330 is in the on state, and the fan assembly 300 is started.

In an embodiment, the drive switch 330 is electrically connected to the drive component 310. The switch paddle 420 can press the drive switch 330 to control the on-off of the drive switch 330, so as to control the start and shutdown of the drive component 310 through the drive switch 330, thereby controlling the start and shutdown of the fan 320 by the drive component 310.

As shown in FIG. 4, in an embodiment, a pressing slope 421 is provided on a side of the switch paddle 420 facing the pressable button 331, and the pressing slope 421 is configured to press the pressable button 331. In some embodiments, the pressing slope 421 can press the pressable button 331, so that the pressable button 331 can be switched between the pressed state and the released state, thereby allowing the drive switch 330 to be switched between the on state and the off state.

In an embodiment, a vertical distance between the pressing slope 421 and the pressable button 331 gradually increases from one end of the pressing slope 421 to the other end of the pressing slope 421. When the switch paddle 420 is switched to the second gear position, the end of the pressing slope 421 with the largest vertical distance from the pressable button 331 is near the pressable button 331, and the pressing slope 421 is separated from the pressable button 331. In this case, the pressable button 331 is in the released state, so that the drive switch 330 is in the off-state, and the fan assembly 300 is shut down. When the switch paddle 420 is switched to the first gear position, the end of the pressing slope 421 closest to the pressable button 331 in the vertical direction is in contact with the drive switch 330. The pressable button 331 is pressed by the pressing slope 421 of the switch paddle 420, so that the drive switch 330 is in the on-state, and the fan assembly 300 is started. Specifically, when the switch paddle 420 is at the second gear position, the pressing slope 421 of the switch paddle 420 is separated from the pressable button 331. In the process of switching the switch paddle 420 from the second gear position to the first gear position, the end of the pressing slope 421 closest to the pressable button 331 in the vertical direction gradually approaches the pressable button 331, so that the pressing slope 421 gradually approaches the pressable button 331 until the pressable button 331 is pressed.

As shown in FIG. 4, in an embodiment, the spray nozzle assembly 200 includes a spray nozzle 210 and a pipeline 220. An end of the pipeline 220 is connected to the housing 100, and the other end of the pipeline 220 is connected to the spray nozzle 210, so as to realize the communication between the housing 100 and the spray nozzle 210. The switch assembly 400 is configured to control opening and shutting of the pipeline 220. The spray nozzle 210 is configured to spray the liquid out from the housing 100 through the pipeline 220. Specifically, when using the backpack sprayer, the switch assembly 400 controls the start of the drive component 310 and the opening of the pipeline 220 simultaneously. The drive component 310 drives the fan 320 to run, so as to provide the spray nozzle 210 with power to spray the liquid out from the housing 100 through the pipeline 220 and the spray nozzle 210.

In an embodiment, one end of the pipeline 220 is connected to the housing 100, and the other end of the pipeline 220 passes through the fan assembly 300 to be connected to the spray nozzle 210.

As shown in FIGS. 2-3, in an embodiment, a first through hole 411 is provided on the switch assembly 400. A second through hole 221 is provided on the pipeline 220, and the pipeline 220 enables the communication between the housing 100 and the spray nozzle 210 through the second through hole 221. The switch assembly 400 can rotate with respect to the spray nozzle assembly 200, so that the switch assembly 400 can be switched between the first gear position and the second gear position. When the switch assembly 400 is switched to the first gear position, the first through hole 411 is aligned with the second through hole 221, so that the switch assembly 400 and the pipeline 220 are communicated to realize the communication between the housing 100 and the spray nozzle 210. When the switch assembly 400 is switched to the second gear position, the first through hole 411 is staggered with the second through hole 221, so that the switch assembly 400 and the pipeline 220 are not communicated to further enable that the housing 100 is not communicated with the spray nozzle 210. In some embodiments, the switch assembly 400 rotates with respect to the spray nozzle assembly 200 to achieve the switching between the first gear position and the second gear position, so that the first through hole 411 and the second through hole 221 are switched between being aligned and staggered, thereby controlling the communication and isolation between the housing 100 and the spray nozzle 210.

As shown in an embodiment in FIGS. 2-3, the first through hole 411 is arranged on the valve 410.

As shown in an embodiment in FIGS. 2-3, the spray nozzle assembly 200 further includes a pipeline connector 230. One end of the pipeline connector 230 is connected to the pipeline 220, and the other end of the pipeline connector 230 is connected to the spray nozzle 210. The switch assembly 400 is configured to control the opening and shutting of the pipeline connector 230. In some embodiments, when the switch assembly 400 is at the first gear position, the pipeline connector 230 is in communication with the pipeline 220, and when the switch assembly 400 is switched to the second gear position, the pipeline connector 230 is shut off.

As shown in FIG. 2, in an embodiment, the backpack sprayer further includes a hand-holding part 1800. One end of the hand-holding part 1800 is connected to the spray nozzle assembly 200, and the other end of the hand-holding part 1800 is connected to the fan assembly 300.

As shown in FIGS. 2 and 4, in an embodiment, the valve 410, the switch paddle 420 and the pipeline connector 230 are all arranged in the hand-holding part 1800, and the move component 430 is partially inserted into the hand-holding part 1800 to be connected to the valve 410.

As shown in FIGS. 2 and 4, in an embodiment, the switch assembly 400 further includes a valve body-mounting component 440. The valve body-mounting component 440 is connected to the hand-holding part 1800, and is configured to fix the valve 410 with respect to the hand-holding part 1800.

As shown in FIG. 3, in an embodiment, the switch assembly 400 further includes a fastener 450. The fastener 450 passes through the valve body-mounting component 440 and the hand-holding part 1800 and is partially inserted into the on-off valve 410, thereby realizing the fixation of the on-off valve 410 with respect to the hand-holding part 1800. Specifically, the fastener 450 may be, but is not limited to a screw.

As shown in FIGS. 2-3, in an embodiment, the valve body-mounting component 440 is arranged on an outer wall of the hand-holding part 1800.

Figure 5:
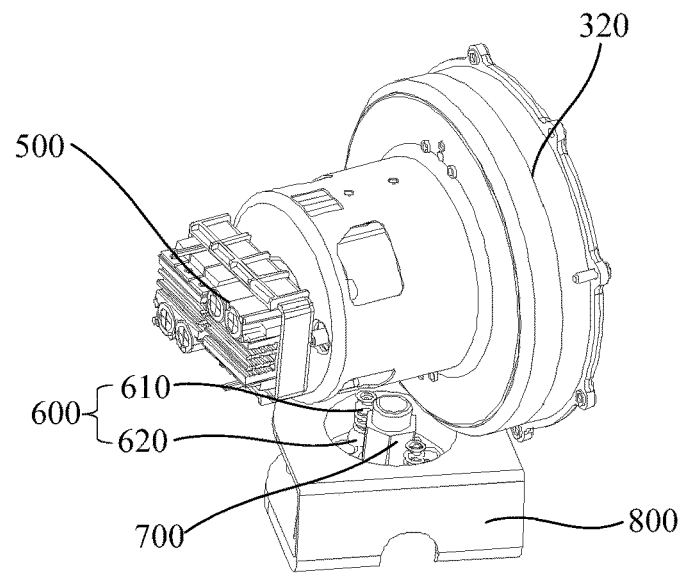
FIG. 5 is a structural diagram of combination of a fan assembly (a housing is not shown) and a fixing component according to an embodiment of the disclosure.

In an embodiment illustrated in FIG. 5, the backpack sprayer further includes a controller 500. The controller 500 is electrically connected to the fan assembly 300 and the switch assembly 400. The switch assembly 400 is configured to control the start and shutdown of the fan assembly 300 through the controller 500.

In an embodiment, the switch assembly 400 can send a control signal to the controller 500, and the controller 500 is configured to receive the control signal sent by the switch assembly 400 to control the start of the fan assembly 300 or the shutdown of the fan assembly 300 after a preset time is reached. Specifically, after the controller 500 receives a second control signal, the fan assembly 300 will continue to run for a preset time, so that the fan assembly 300 can blow off the remaining liquid in the spray nozzle assembly 200, preventing the leakage.

In an embodiment, the control signal includes a first control signal and a second control signal.

The controller 500 controls the fan assembly 300 to start after receiving the first control signal sent by the switch assembly 400. The switch assembly 400 can send the second control signal to the controller 500 while controlling the spray nozzle assembly 200 to be closed. The controller 500 receives the second control signal sent by the switch assembly 400 and then controls the fan assembly 300 to shut down after the preset time is reached.

In an embodiment, the preset time is 2 seconds.

As shown in FIG. 1, in an embodiment, the fan assembly 300 is arranged on the outer side wall of the housing 100.

As shown in FIG. 1, in an embodiment, the fan assembly 300 is rotatably arranged on the outer side wall of the housing 100. The fan assembly 300 is rotated to adjust the angle of the spray nozzle assembly 200 with respect to the housing 100. Specifically, when using the backpack sprayer, the angle of the spray nozzle assembly 200 can be adjusted according to the habits of the user. Specifically, the spray nozzle assembly 200 can be adjusted to locate at the left hand, so that the user can hold the spray nozzle assembly 200 with left hand; or the spray nozzle assembly 200 can be adjusted to locate at the right hand side, so that the user can hold the spray nozzle assembly 200 with right hand. On one hand, it is convenient for left-handed users to use the backpack sprayer of this application. On the other hand, in the practical use, the user can hold the spray nozzle assembly 200 alternately with both hands.

As shown in FIGS. 1 and 5, in an embodiment, the backpack sprayer further includes an adjustment structure 600. The fan assembly 300 is rotatably arranged on the outer side wall of the housing 100 through the adjustment structure 600. Specifically, the adjustment structure 600 is rotatably arranged on the outer side wall of the housing 100, and is connected to the fan assembly 300. The rotation of the fan assembly 300 can drive the adjustment structure 600 to rotate with respect to the housing 100 to adjust the angle of the spray nozzle assembly 200 with respect to the housing 100.

Figure 6:
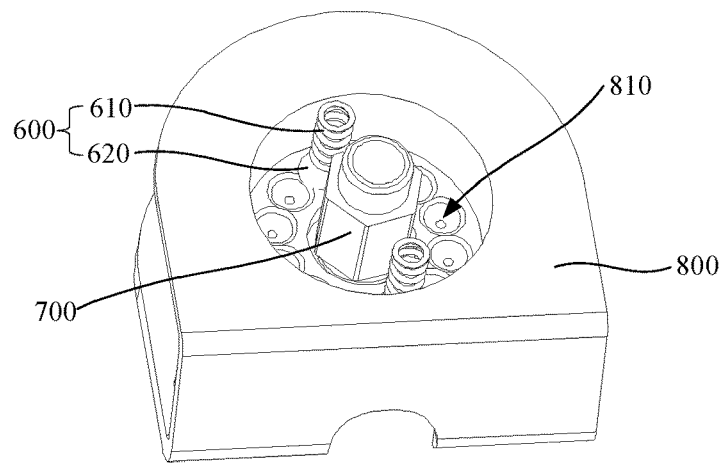
FIG. 6 is a structural diagram of combination of the fixing component and an adjustment structure according to an embodiment of the disclosure.

As shown in FIGS. 1 and 6, in an embodiment, a plurality of positioning grooves 810 are provided spaced apart on the outer side wall of the housing 100, and the adjustment structure 600 can be engaged with the positioning grooves 810. The rotation of the fan assembly 300 can drive the adjustment structure 600 to rotate with respect to the housing 100, so that the adjustment structure 600 is sequentially engaged with the positioning grooves 810 at different positions, thereby realizing the fixation of the fan assembly 300 at different angles with respect to the housing 100.

As shown in FIG. 6, in an embodiment, a plurality of adjustment structures 600 are provided, and each adjustment structure 600 can be engaged with a corresponding positioning groove 810. The rotation of the fan assembly 300 can drive the adjustment structures 600 to rotate with respect to the housing 100, so that individual adjustment structures 600 are sequentially engaged with the positioning grooves 810 at different positions, thereby realizing the fixation of the fan assembly 300 at different angles with respect to the housing 100. Specifically, the plurality of adjustment structures 600 make the engagement between the adjustment structure 600 and the positioning groove 810 more reliable and stable, thereby rendering the fixation of the fan assembly 300 with respect to the housing 100 more reliable and stable. In an embodiment, two adjustment structures 600 are provided. The two adjustment structures 600 make the engagement between the adjustment structure 600 and the positioning groove 810 more reliable and stable, thereby rendering the fixation of the fan assembly 300 with respect to the housing 100 more reliable and stable.

As shown in FIGS. 1 and 5-6, in an embodiment, the adjustment structure 600 includes an elastic component 610 and a butting component 620 that are connected to each other. One end of the elastic component 610 away from the butting component 620 is connected to the fan assembly 300. The butting component 620 is configured to elastically abut in the positioning groove 810 to realize the engagement between the butting component 620 and the positioning groove 810. The fan assembly 300 is rotated, so as to drive the butting component 620 to rotate with respect to the housing 100 through the elastic component 610, thereby allowing the butting component 620 to be engaged sequentially with different positioning grooves 810. The elastic component 610 is configured to provide an elastic force to keep the butting component 620 elastically abutting against the positioning groove 810. Specifically, the elastic component 610 may be, but is not limited to, a spring.

In an initial state, the elastic component 610 is compressed, and the elastic component 610 can provide an elastic force for keeping the butting component 620 abutting against the positioning groove 810.

The butting component 620 is engaged with the positioning groove 810 at the first position on the outer wall of the housing 100, so that the fan assembly 300 connected to the elastic component 610 can be positioned at a first angle relative to the housing 100, thereby realizing the fixation of the fan assembly 300 with respect to the housing 100. When the fan assembly 300 needs to be rotated, an external force is applied to the fan assembly 300 to drive the fan assembly 300 to rotate with respect to the housing 100. At this time, the elastic force of the elastic component 610 is offset by the external force, and the butting component 620 is separated from the positioning groove 810 and rotates with respect to the housing 100. Meanwhile, the elastic component 610 is further compressed. When the fan assembly 300 is rotated to the required second angle with respect to the housing 100, the external force applied to the fan assembly 300 is removed. At this time, the elastic component 610 is elastically reset. Under the elastic force of the elastic component 610, the butting component 620 is engaged with the positioning groove 810 at the second position on the outer side wall of the housing 100, so that the fan assembly 300 is positioned at the second position with respect to the housing 100.

In an embodiment, a shape of the butting component 620 is adapted to a shape of the positioning groove 810, and the butting component 620 may be, but is not limited to, a spherical shape.

Figure 7:
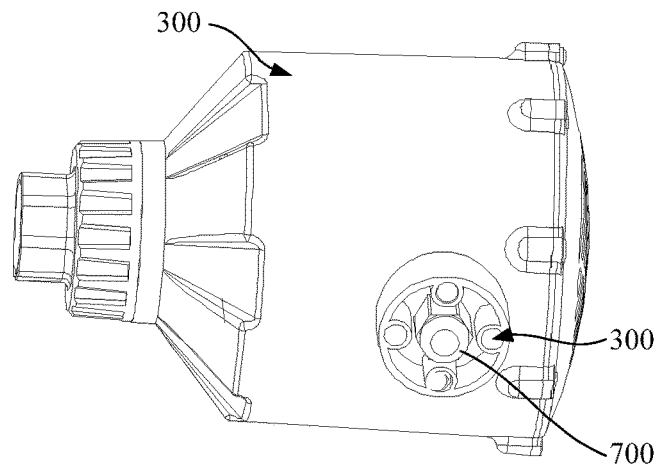
FIG. 7 is a structural diagram of the fan assembly according to an embodiment of the disclosure.

As shown in FIGS. 6-7, in an embodiment, a counterbore 321 is provided on a side of the fan assembly 300 facing the adjusting structure 600. The elastic component 610 is accommodated in the counterbore 321 and connected to the fan assembly 300. Specifically, the counterbore 321 can play a role in guiding the elastic component 610 and the butting component 620.

In an embodiment, the counterbore 321 is arranged on the fan 320.

Figure 8:
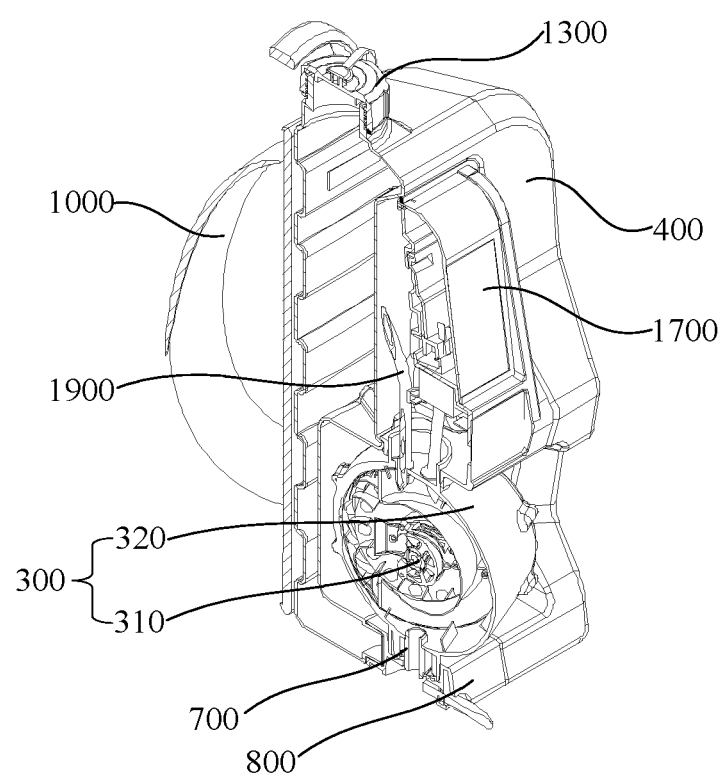
FIG. 8 is a section view of the backpack sprayer according to an embodiment of the disclosure.

As shown in FIGS. 6 and 8, in an embodiment, the backpack sprayer further includes a guide shaft 700. The guide shaft 700 is arranged on the outer side wall of the housing 100, and is connected to the fan assembly 300.

The fan assembly 300 can rotate around the axis of the guide shaft 700 to drive the adjustment structure 600 to rotate with respect to the housing 100 around the axis of the guide shaft 700. Specifically, the guide shaft 700 is configured to guide the fan assembly 300 when the fan assembly 300 rotates, preventing the fan assembly 300 from deviating.

As shown in FIGS. 6 and 8, in an embodiment, the backpack sprayer further includes a fixing component 800. The fixing component 800 is arranged on the outer side wall of the housing 100. The adjusting structure 600 is rotatably arranged on the fixing component 800. The positioning groove 810 is arranged on the fixing component 800.

As shown in FIG. 6, in an embodiment, the guide shaft 700 is arranged on the fixing component 800.

As shown in an embodiment in FIG. 1, the backpack sprayer further includes a connecting pipe 900. One end of the connecting pipe 900 is connected to the fan assembly 300, and the other end of the connecting pipe 900 is connected to the spray nozzle assembly 200.

In an embodiment, one end of the connecting pipe 900 is connected to the fan 320, and the end of the connecting pipe 900 away from the fan assembly 300 is connected to the spray nozzle 210. One end of the pipeline 220 is connected to the housing 100, and the other end of the pipeline 220 sequentially passes through the fan assembly 300 and the connecting pipe 900 to be connected to the spray nozzle 210. In an embodiment, a length of the pipeline 220 is larger than a length of the connecting pipe 900. When the connecting pipe 900 is in an extended state, the pipeline 220 can pass through the fan assembly 300 and the connecting pipe 900 in sequence to be connected to the fan 320 to ensure that the liquid in the housing 100 can be sprayed out from the spray nozzle 210 through the pipeline 220. Specifically, the connecting pipe 900 enables the spray nozzle 210 to extend a larger distance, so that the spray nozzle 210 can spray the liquid farther.

In an embodiment, one end of the pipeline 220 is connected to the housing 100, and the other end of the pipeline 220 sequentially passes through the fan assembly 300 and the connecting pipe 900 to be connected to the pipeline connector 230, so that the liquid in the housing 100 can pass through the pipeline 220 and the pipeline connector 230 to be sprayed from the spray nozzle 210.

In an embodiment, the connecting pipe 900 is made of a flexible material. Specifically, the connecting pipe 900 made of a flexible material is bendable, so that the user can adjust the position and angle of the spray nozzle assembly 200 by bending the connecting pipe 900 without moving.

Figure 9:
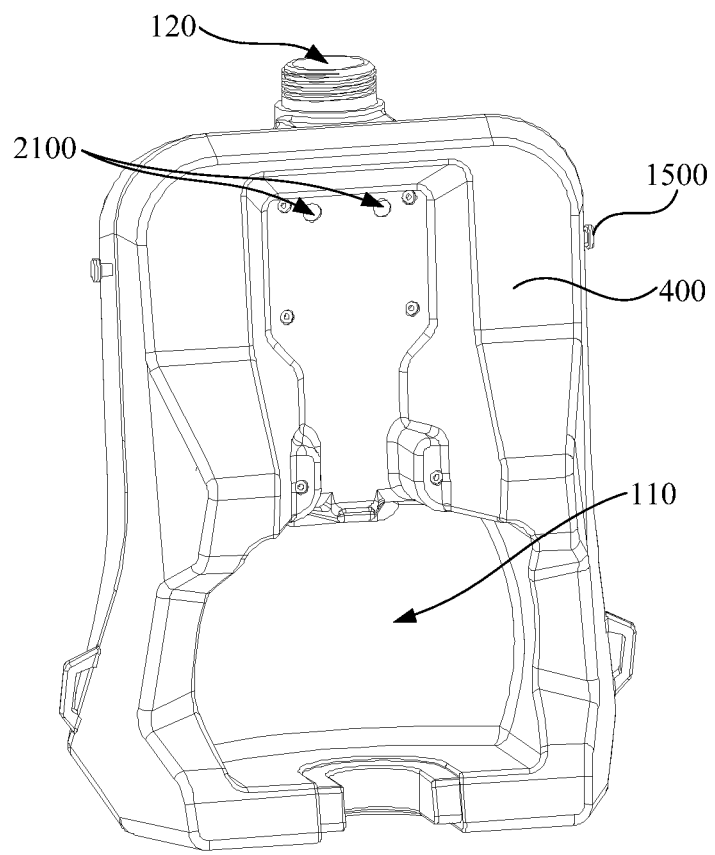
FIG. 9 is a structural diagram of a housing according to an embodiment of the disclosure.

As shown in FIGS. 1 and 9, in an embodiment, the housing 100 is provided with a recess 110. The fan assembly 300 is arranged in the recess 110 to prevent the fan assembly 300 from protruding outward, thereby improving the space utilization.

As shown in FIG. 8, in an embodiment, the backpack sprayer further includes a strap 1000. The strap 1000 is arranged on the outer side wall of the housing 100, and the strap 1000 can be hung on the shoulder of the user to carry the backpack sprayer on the back of the user, thereby facilitating the use and transfer of the backpack sprayer.

As shown in FIG. 8, in an embodiment, the strap 1000 is arranged on the outer side wall of the housing 100 away from the fan assembly 300 to prevent the interference of the fan assembly 300 when the backpack sprayer is carried on the back of the user through the strap 1000.

Figure 10:
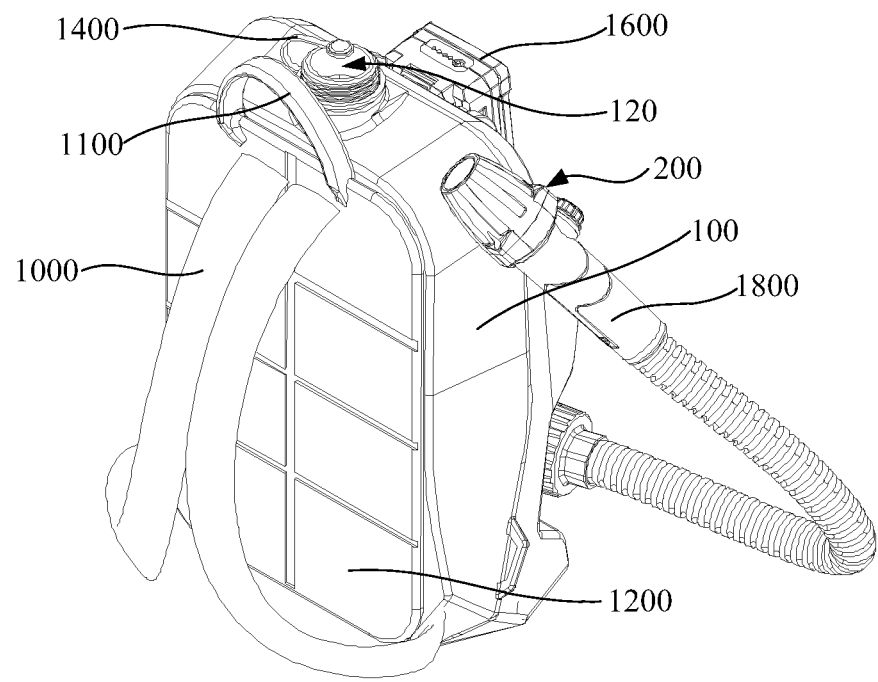
FIG. 10 is a structural diagram of the backpack sprayer according to an embodiment of the disclosure from another perspective.

As shown in FIG. 10, in an embodiment, a plurality of straps 1000 are provided. The plurality of straps 1000 are arranged spaced apart on the outer side wall of the housing 100. The plurality of the straps 1000 facilitate the carrying of the backpack sprayer on the back of the user. In an embodiment, the number of the straps 1000 is two. The two straps 1000 are hung on the shoulders of the user, so that the backpack sprayer can be carried on the back of the user.

As shown in FIG. 10, in an embodiment, the backpack sprayer further includes a handle 1100. The handle 1100 is arranged on the outer side wall of the housing 100, and the user can transfer the backpack sprayer by holding the handle 1100.

As shown in FIG. 10, in an embodiment, the handle 1100 is arranged on the top of the outer side wall of the housing 100, which is more convenient for the user to hold the handle 1100.

As shown in FIG. 10, in an embodiment, the backpack sprayer further includes a soft cushion 1200. The soft cushion 1200 is arranged on the outer side wall of the housing 100. The soft cushion 1200 and the strap 1000 are located on the same side of the housing 100. When the user carries the backpack sprayer, the back of the user is in contact with the housing 100 through the soft cushion 1200, so that the soft cushion 1200 can protect the back of the user from being scratched by the housing 100.

As shown in FIG. 9, in an embodiment, the housing 100 includes an opening 120, which communicates with the inside of the housing 100. The liquid is injected into the housing 100 through the opening 120.

As shown in FIG. 8, in an embodiment, the backpack sprayer further includes a cover component 1300, which is configured to cover the opening 120. Specifically, after the liquid is injected into the housing 100, the opening 120 on the housing 100 is covered by the cover component 1300, preventing the liquid from spilling out of the housing 100 through the opening 120 when using the backpack sprayer. Moreover, the cover component 1300 can also prevent external dirt from entering the housing 100 through the opening 120.

As shown in FIG. 10, in an embodiment, the backpack sprayer further includes a connector 1400. One end of the connector 1400 is connected to the housing 100, and the other end of the connector 1400 is connected to the cover component 1300. Specifically, when the opening 120 is not covered by the cover component 1300, since the cover component 1300 is connected to the housing 100 through the connector 1400, the cover component 1300 is not easy to get lost.

As shown in FIG. 1, in an embodiment, the backpack sprayer further includes a hanging component 1500. The hanging component 1500 is arranged on the outer side wall of the housing 100, and is configured to hang the spray nozzle assembly 200.

As shown in FIG. 1, in an embodiment, a plurality of hanging components 1500 are provided. The plurality of hanging components 1500 are arranged spaced apart on the outer side wall of the housing 100, rendering the hanging of the spray nozzle assembly 200 more convenient.

In an embodiment, the number of the hanging components 1500 is two. The two hanging components 1500 are arranged oppositely, so that the spray nozzle assembly 200 can be mounted on opposite sides of the housing 100. Specifically, the two hanging components 1500 relatively arranged on the left and right sides of the housing 100. If the spray nozzle assembly 200 is located on the left side of the housing 100 while in use, the spray nozzle assembly 200 is hung on the left side of the housing 100 after using the backpack sprayer. If the spray nozzle assembly 200 is located on the right side of the housing 100 while in use, the spray nozzle assembly 200 is hung on the right side of the housing 100 after using the backpack sprayer.

As shown in FIG. 1, in an embodiment, the backpack sprayer further includes a power supply 1600. The power supply 1600 is arranged on the outer side wall of the housing 100. The power supply 1600 is electrically connected to the fan assembly 300, and is configured to power the fan assembly 300. In an embodiment, the power supply 1600 is electrically connected to the drive component 310 to power the drive component 310.

In an embodiment, the power supply 1600 is electrically connected to the controller 500, and is configured to power the fan assembly 300 through the controller 500.

In an embodiment, the backpack sprayer further includes a conducting wire, and the power supply 1600 is electrically connected to the controller 500 through the conducting wire.

In an embodiment, the backpack sprayer further includes a first tubular part. One end of the first tubular part is connected to the pipeline 220, and the other end of the first tubular part is inserted into the housing 100. The liquid in the housing 100 can sequentially pass through the first tubular part and the pipeline 220 to enter the spray nozzle assembly 200.

As shown in FIG. 8, in an embodiment, the backpack sprayer further includes a second tubular part 1900. One end of the second tubular part 1900 is inserted into the fan assembly 300, and the other end of the second tubular part 1900 is inserted into the housing 100.

The second tubular part 1900 is configured to pass the wind pressure generated by the fan assembly 300 into the housing 100 to make the housing 100 have a greater pressure, so that the liquid in the housing 100 can enter the fan assembly 300 more quickly under the action of the pressure. Specifically, one end of the second tubular part 1900 is inserted into the fan 320 of the fan assembly 300, and the drive component 310 drives the fan to rotate to generate wind pressure.

Figure 11:
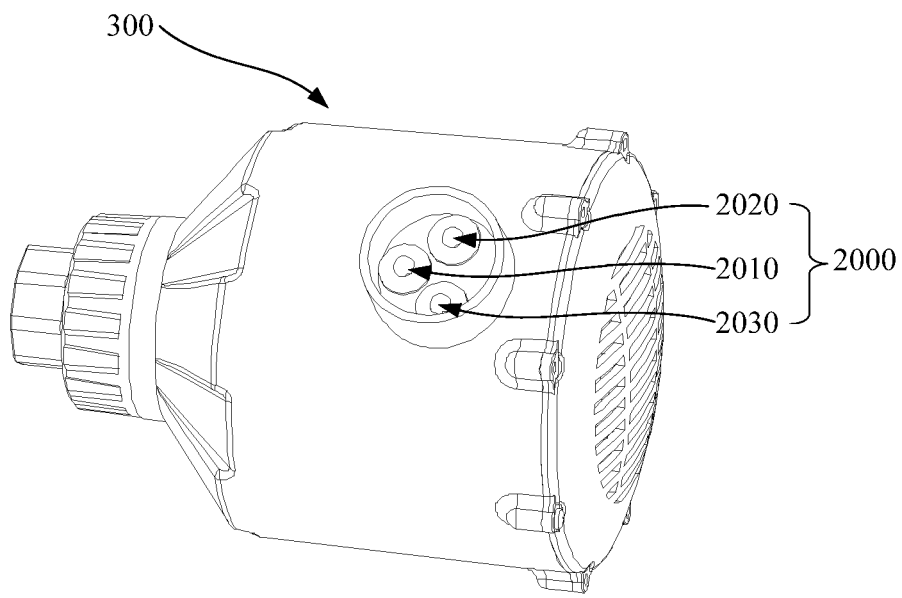
FIG. 11 is a structural diagram of the fan assembly according to another embodiment of the disclosure.

As shown in FIG. 11, the fan assembly 300 is provided with a first hole 2000, which is configured to allow at least one of the first tubular part, the second tubular part 1900 and the conducting wire to extend into the fan assembly 300. Specifically, the first hole 2000 is arranged on the fan 320.

As shown in FIG. 11, in an embodiment, the first hole 2000 includes a first sub-hole 2010, a second sub-hole 2020 and a third sub-hole 2030 that are arranged spaced apart on the fan assembly 300. The first tubular part passes through the first sub-hole 2010 to realize the connection between the pipeline 220 and the housing 100. The second tubular part 1900 passes through the second sub-hole 2020 to realize the connection between the fan assembly 300 and the housing 100. The conducting wire passes through the third sub-hole 2030 to realize the electric connection between the power supply 1600 and the controller 500. Specifically, the first sub-hole 2010, the second sub-hole 2020, and the third sub-hole 2030 are configured to prevent the first tubular part, the second tubular part 1900 and the conducting wire from interfering with each other.

As shown in FIG. 9, the housing 100 is provided with two second holes 2100, and the first tubular part passes through the first sub-hole 2010 and one second hole 2100 to realize the connection between the spray nozzle assembly 200 and the housing 100. The second tubular part 1900 passes through the second sub-hole 2020 and the other second hole 2100 to realize the connection between the fan assembly 300 and the housing 100.

Figure 12:
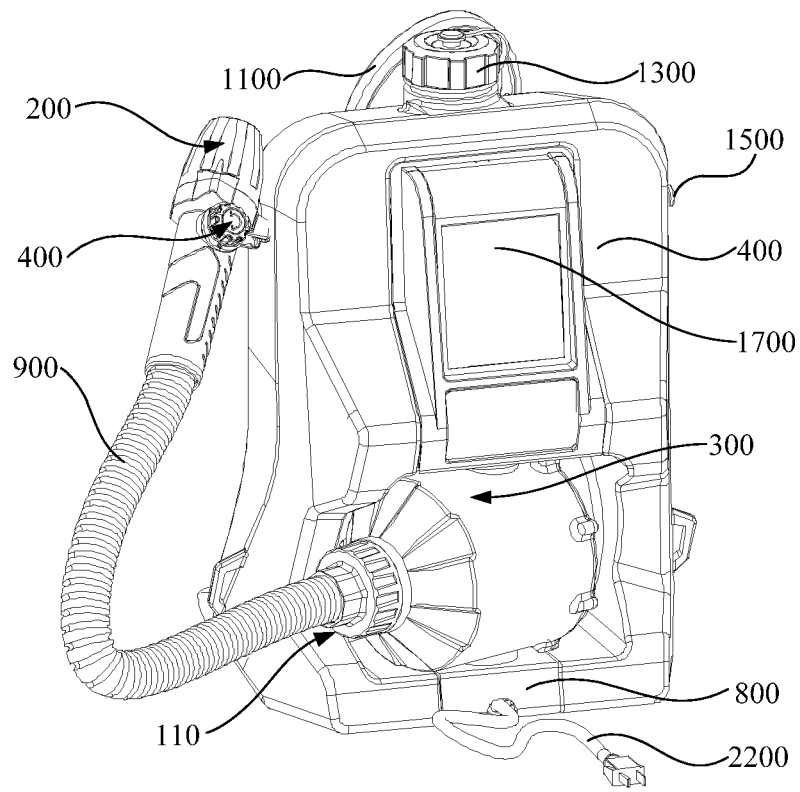
FIG. 12 is a structural diagram of the backpack sprayer according to another embodiment of the disclosure.

As shown in FIG. 12, in an embodiment, the backpack sprayer further includes a power supply outer panel 1700. The power supply outer panel 1700 is configured to cover the power supply 1600. Specifically, the power supply 1600 is covered by the power supply outer panel 1700 to make the backpack sprayer look more beautiful.

As shown in FIG. 12, in an embodiment, the power supply outer panel 1700 is connected to the housing 100 to realize the fixation of the power supply outer panel 1700 with respect to the housing 100.

As shown in FIG. 12, in an embodiment, the backpack sprayer further includes a power plug 2200. One end of the power plug 2200 is electrically connected to the fan assembly 300, and the other end of the power plug 2200 is configured to be electrically connected with an external power supply, so that the fan assembly 300 is powered by the external power supply. In an embodiment, the external power supply is electrically connected to the drive component 310 through the power plug 2200 to supply power to the drive component 310.

In actual use, the existence of any one of the power supply 1600 and the power plug 2200 can make the backpack sprayer work normally. In view of this, it can only select one of the power supply 1600 and the power plug 2200 to be applied to the backpack sprayer.

The above are only the preferred embodiments of the present disclosure, and are not intended to limit the scope of the present disclosure. Any modifications, replacements and improvements made by those skilled in the art without departing from the spirit of the present disclosure, shall fall within the scope of the present disclosure defined by the appended claims.

What is claimed is:
1. A backpack sprayer, comprising:
a housing;
a spray nozzle assembly;
a fan assembly; and
a switch assembly;
wherein the housing is configured to contain a liquid; and the spray nozzle assembly is communicated with the housing, and is configured to spray the liquid out from the housing;
the fan assembly is connected to the spray nozzle assembly, and is configured to provide the spray nozzle assembly with power to spray the liquid out from the housing; and
the switch assembly is connected to the spray nozzle assembly, and is electrically connected to the fan assembly; and the switch assembly is configured to simultaneously control opening and shutting of the spray nozzle assembly and start and shutdown of the fan assembly.

2. The backpack sprayer of claim 1, wherein the switch assembly is movable with respect to the spray nozzle assembly to allow the switch assembly to be switched between a first gear position and a second gear position; when the switch assembly is at the first gear position, the fan assembly is started and the spray nozzle assembly is opened; and when the switch assembly is at the second gear position, the fan assembly is shut down and the spray nozzle assembly is shut off.

3. The backpack sprayer of claim 2, wherein the switch assembly is rotatable with respect to the spray nozzle assembly to allow the switch assembly to be switched between the first gear position and the second gear position.

4. The backpack sprayer of claim 3, wherein the switch assembly comprises a valve and a switch paddle connected to the valve; the valve is connected to the spray nozzle assembly; the switch paddle is configured to follow the valve to rotate synchronously with respect to the spray nozzle assembly, so that the valve and the switch paddle are synchronously switched between the first gear position and the second gear position; when the switch paddle is switched to the first gear position, the fan assembly is started; when the switch paddle is switched to the second gear position, the fan assembly is shut down; when the valve is switched to the first gear position, the spray nozzle assembly is opened; and when the valve is switched to the second gear position, the spray nozzle assembly is shut off.

5. The backpack sprayer of claim 4, further comprising:
a drive switch;
wherein the drive switch is connected to the valve, and is electrically connected to the fan assembly; the drive switch is provided with a pressable button; the valve is configured to drive the switch paddle to rotate synchronously with respect to the spray nozzle assembly, so that the switch paddle presses or releases the pressable button to switch the drive switch between an on-state and an off-state; when the drive switch is in the on-state, the fan assembly is started; and when the drive switch is in the off-state, the fan assembly is shut down.

6. The backpack sprayer of claim 5, wherein a pressing slope is provided on a side of the switch paddle facing the pressable button, and the pressing slope is configured to press the pressable button.

7. The backpack sprayer of claim 3, wherein the spray nozzle assembly comprises a spray nozzle and a pipeline; one end of the pipeline is connected to the housing, and the other end of the pipeline is connected to the spray nozzle, so as to realize a communication between the housing and the spray nozzle; the switch assembly is configured to control opening and shutting of the pipeline; and the spray nozzle is configured to spray the liquid out from the housing through the pipeline.

8. The backpack sprayer of claim 7, wherein a first through hole is provided on the switch assembly; a second through hole is provided on the pipeline; the communication between the housing and the spray nozzle is enabled through the second through hole of the pipeline; the switch assembly is rotatable with respect to the spray nozzle assembly to allow the switch assembly to be switched between the first gear position and the second gear position; when the switch assembly is switched to the first gear position, the first through hole is aligned with the second through hole, so that the switch assembly and the pipeline are communicated to further realize the communication between the housing and the spray nozzle; and when the switch assembly is switched to the second gear position, the first through hole is staggered with the second through hole, so that the switch assembly and the pipeline are not communicated to realize shut-off between the housing and the spray nozzle.

9. The backpack sprayer of claim 1, further comprising:
a controller;
wherein the controller is electrically connected to the fan assembly and the switch assembly; the switch assembly is configured to send a control signal to the controller, and the controller is configured to receive the control signal sent by the switch assembly to control the start and shutdown of the fan assembly.

10. The backpack sprayer of claim 9, wherein the controller is configured to receive the control signal sent by the switch assembly to control the fan assembly to start, or control the fan assembly to shut down after a preset time is reached.

* * * * *